United States Patent

[11] 3,599,193

[72] Inventors Lawrence Cote
Englewood, Colo.;
Carl C. Roecks, Palos Verdes Estates, Calif.
[21] Appl. No 804,359
[22] Filed Feb. 24, 1969
[45] Patented Aug. 10, 1971
[73] Assignee Data Products Corporation
Culver City, Calif.

[54] TRIFURCATED GIMBAL HEAD MOUNT
8 Claims, 7 Drawing Figs.

[52] U.S. Cl. .......... 340/174.1E, 179/100.2 P
[51] Int. Cl. .......... G11b 5/60
[50] Field of Search .......... 340/174.1 E, 174.1 F, 174.1 C; 179/100.2 CA, 100.2 P

[56] References Cited
UNITED STATES PATENTS

| | | | |
|---|---|---|---|
| 3,071,773 | 1/1963 | Haughton et al. .... | 340/174.1 |
| 3,158,847 | 11/1964 | Pulkraber .......... | 340/174.1 |
| 3,183,516 | 5/1965 | Sliter .......... | 340/174.1 |
| 3,292,169 | 12/1966 | D'Alessandro et al. ...... | 340/174.1 |
| 3,310,792 | 3/1967 | Groom et al. .......... | 340/174.1 |
| 3,368,210 | 2/1968 | Zimmer .......... | 340/174.1 |
| 3,430,006 | 2/1969 | Taylor et al. .......... | 340/174.1 |

*Primary Examiner*—Bernard Konick
*Assistant Examiner*—Vincent P. Canney
*Attorneys*—Samuel Lindenberg and Arthur Freilich

ABSTRACT: Apparatus for use in a disc storage system to support the read/write heads on the flying disc surface, comprising a gimbal formed as a flat sheet of spring material with an outer ring portion, a central portion within the outer ring portion for supporting the head, and a narrow neck connecting them. Each gimbal is held on a long flexible support leaf, and the heads are landed and withdrawn by landing springs which can depress or release the support leaves.

INVENTORS
LAWRENCE COTE
CARL C. ROECKS
BY
Lindenberg & Freilich
ATTORNEYS

INVENTORS
LAWRENCE COTE
CARL C. ROECKS
BY
Lindenberg & Freilich
ATTORNEYS

LAWRENSCE COTE
CARL C. ROECKS
INVENTORS

BY Lindenberg & Freilich

ATTORNEYS

TRIFURCATED GIMBAL HEAD MOUNT

BACKGROUND OF THE INVENTION

1. Field of the Invention

This invention relates to head suspension apparatus for information storage and retrieval systems.

2. Description of the Prior Art

Disc storage systems are memories which employ revolving discs with magnetically retentive surfaces. The surface of each revolving disc can define many concentric circular tracks, such as several hundred, with bits of information recorded successively along each track. Read/write heads are positioned over the tracks to store and retrieve information from them.

For a system of fixed disc storage area, a maximum of storage capacity is achieved by narrow track-to-track spacing and close bit-to-bit spacing along a track. Typical recording densities are 600 to 2,000 bits per inch in tracks which are spaced 7 to 20 thousandths of an inch from each other. With such recording densities and the high rotational speeds employed, such as 40 revolutions per second for 14 inch diameter discs, disc storage systems are capable of recording and reading out data at a typical rate of 1,000,000 bits per second.

The read/write heads used in disc stores are generally mounted on air bearings, which float them about 100 millionths inch above the disc. Such air flotation is often called flying, and the disc storage surface is referred to as a flying surface. The read/write heads must be supported in a manner which allows them to adjust easily to the local surface of the disc and its boundary layer of air. Yet the heads must retain their radial position so that they remain centered on the desired storage track. Head suspension apparatus which facilitated adjustment of the heads to the flying surface without substantial radial movement of the heads would aid in the realization of high recording densities and therefore high storage capabilities.

OBJECTS AND SUMMARY OF THE INVENTION

One object of the present invention is to provide improved suspension apparatus for the read/write heads of a disc storage system.

Another object is to provide improved head landing and retraction apparatus for a disc storage system.

In accordance with the present invention, a disc store is provided which includes improved suspension and landing apparatus for the read/write heads. The suspension apparatus comprises a flat spring gimbal which includes two spaced support points where the gimbal is fixed to a support leaf. A gimbal portion on which the head is mounted, is located directly between the support points. The support points and head mounting area are coupled by a connecting portion which extends upstream (with respect to the flying disc surface) from the support points, and then downstream to the head mounting area.

In one embodiment of the invention, the gimbal comprises a ring shaped outer portion supported at diametrically opposite sides, a central portion on which the head is mounted, and a narrow-necked connecting portion extending from the central portion to an area of the outer portion. The connecting portion of the gimbal provides sufficient flexibility for high compliance, to enable head movement toward and away from the flying surface and for roll and pitch rotational adjustments. However, the planar form of the gimbal makes it stiff in the radial direction to enable location precisely over a particular track. The planar form also assures repeatable alignment of the head gap with the magnetized patterns previously written, by reason of its resistance to rotation about an axis normal to the flying surface.

The gimbal is mounted on a long flexible support leaf that tends to hold it away from the disc surface. A landing spring can be released to press against the end of the support leaf and head to deflect them so that the head moves onto the disc. The support leaf provides flexibility for readily raising and lowering the head, yet its long planar shape prevents substantial side deflection which would move it along a track, or radial deflection which would move it toward another track.

The novel features of the invention are set forth with particularity in the appended claims. The invention will be best understood from the following description when read in conjunction with the accompanying drawings.

DESCRIPTION OF THE PREFERRED EMBODIMENT

Figure 1:
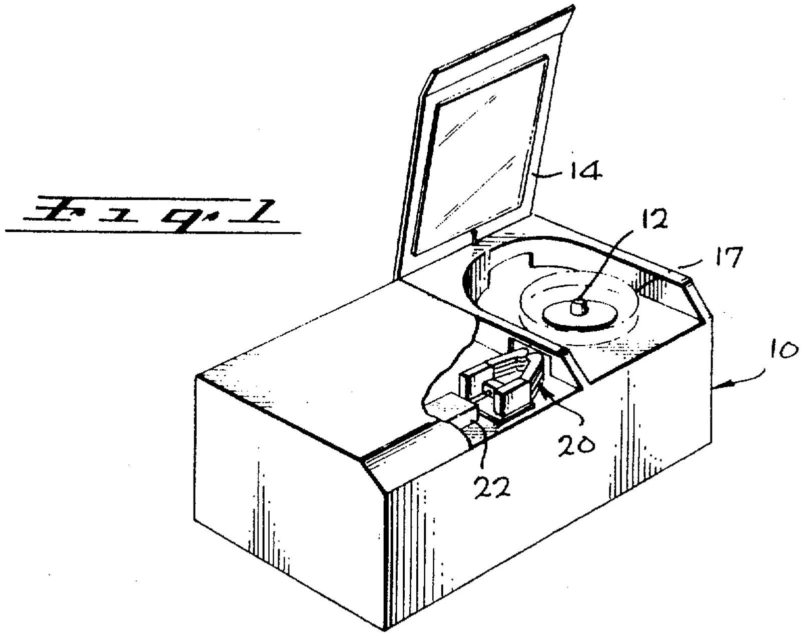
FIG. 1 is a perspective, partially cutaway view of a disc file constructed in accordance with the invention.

FIG. 1 shows a disc storage drive 10 having a spindle 12 adapted to receive a disc pack with six discs, shown at 17. When a disc pack is in place on the spindle, a cover 14 is closed over the pack and the spindle is accelerated and maintained at full speed. Then a head comb assembly 20, which is propelled by a linear servomotor 22, advances a cluster of heads towards the spindle in order to position the read/write heads over the disc surfaces. The servomotor subsequently moves all heads on all surface at one time in accordance with the track address command supplied thereto. Information signals to be recorded by the heads or which are to be read out by them, pass through wires connected to the heads. In this way, information is read into or out of the disc pack.

Figure 2:
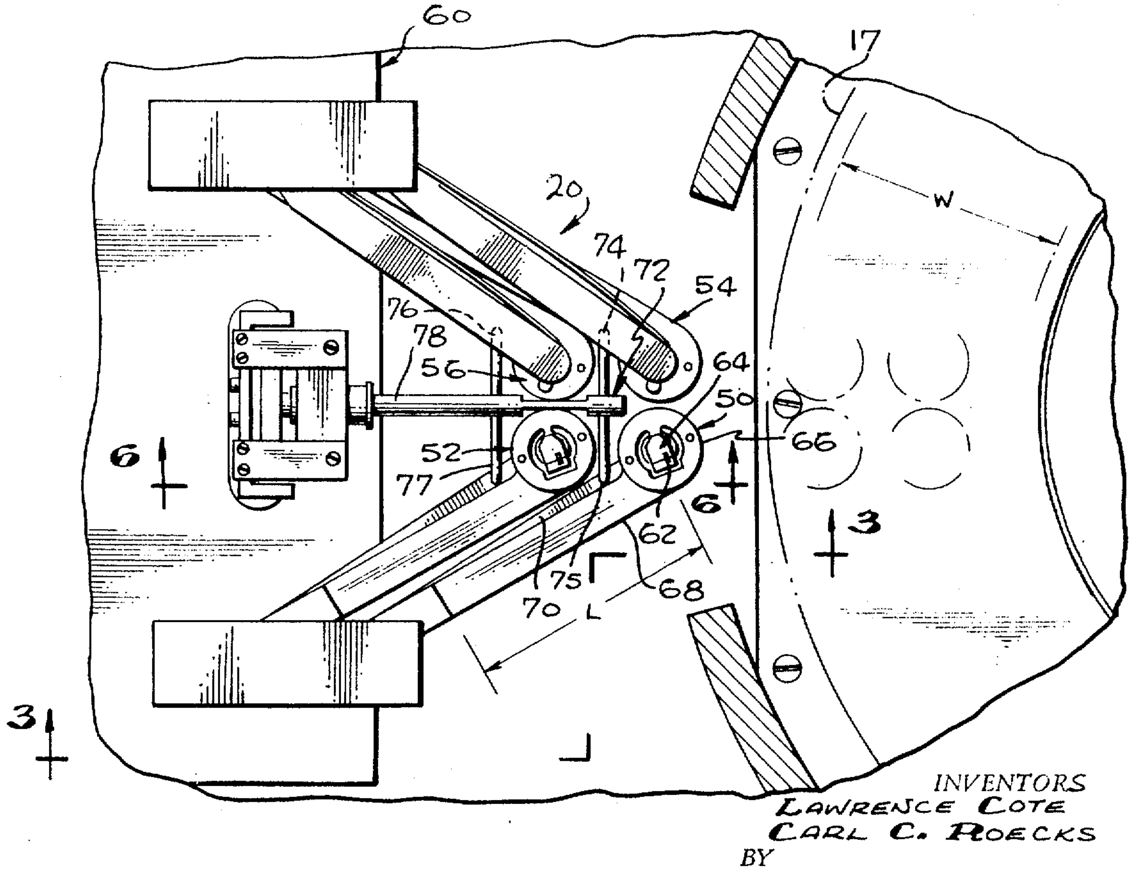
FIG. 2 is a partial plan view of the disc file of FIG. 1, showing the read/write head assemblies thereof.
Figure 3:
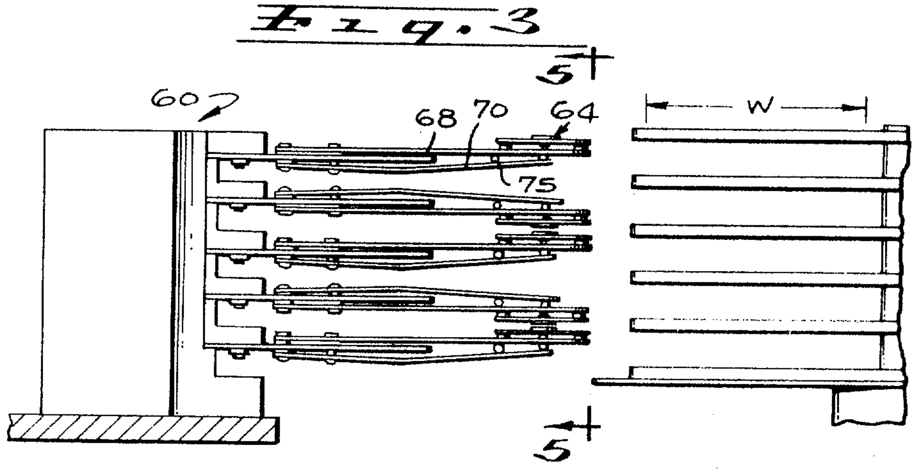
FIG. 3 is a side elevation view of the read/write head assemblies of FIG. 2.

FIGS. 2 and 3 illustrate the radially movable carrier 60 which positions the read/write heads on the disc surfaces. The heads are arranged in four stacks 50, 52, 54 and 56, each stack comprised of five head assemblies and of spring linkages for landing the heads of the assemblies on the disc surfaces and retracting them therefrom. The five heads in stack 50 move into five of the 10 disc pack surfaces, and the five heads on stack 52 move on the same five surfaces. Each of the other five flying surfaces of the disc pack is covered by another pair of heads, one head of each pair being in stack 54 while the other is in stack 56. Thus, in this embodiment of the invention each disc flying surface interacts with two heads.

Each head, such as the head 62, comprises a narrow magnetic core and coil which creates or responds to a small magnetic field of controlled geometry in the magnetic storage disc surface. The head 62 is mounted on a shoe 64 which has a precisely contoured surface. The shoe surface forms an air lubricated slider bearing that slides along the boundary layer of air on the surface of the rotating storage disc. The shoe 64 is supported on a gimbal spring 66. The gimbal spring 66 is mounted on the outer end of a support leaf 68 whose inner end is attached to the carrier 60. The support leaf 68 is constructed of a spring material and is mounted so that it tends to lift the shoe away from the flying surface.

For each head, there is provided a flat landing spring 70 having an inner end fixed to the carrier 60. The landing spring is mounted so that its outer end tends to press against the shoe 64 that carries the head. When the spring 70 is released, it pushes the shoe 64, and the head thereon against a flying surface. When the head assembly is inserted radially into the disc pack, which occurs during startup, the heads must be held away from the flying surfaces to prevent striking the rims of the discs. Such retraction is accomplished by a retractor rod assembly 72, which includes a stack of five rod holders, such as holder 78 which carries four retractor rods 74, 75, 76 and 77. The rod holder 78 can be rotated so that retractor rod 75 depresses the flat pressure spring 70 to hold it away from shoe 64 that carries the read/write head 62. The five rod holders 78 are operated in unison to withdraw and release in unison, all 20 landing springs.

When the machine is started and the spindle reaches full speed, the head assembly is inserted into the disk pack until the heads are over a flying surface. Such insertion is accomplished while the rod holder 78 is turned to hold the spring 70 away from the head. Then the rod holder 78 is turned back to allow the landing spring 70 to bear against the shoe 64 which holds the read/write head 62. The radial position of the carrier at which the heads are simultaneously lifted or pressed against the flying surface is controlled by a cam. The cam, which will be described in detail below, is positioned under carrier 60 and it operates a cam follower that rotates the rod holders 78.

Figure 4:
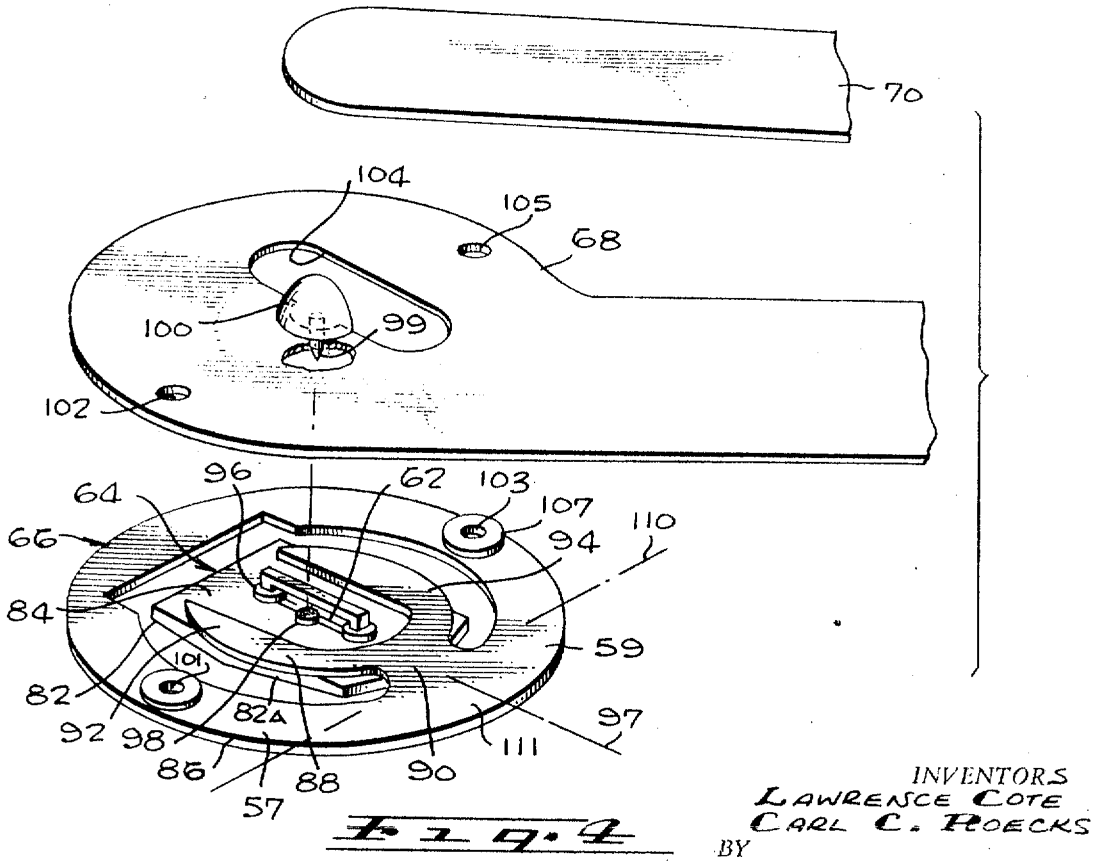
FIG. 4 is a partial perspective view of the gimbal suspension system of the disc file of FIG. 1.
Figure 5:
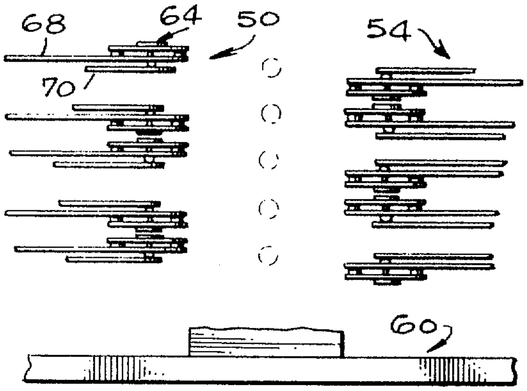
FIG. 5 is an end view taken on the line 5—5 of FIG. 3.

FIG. 4 illustrates the head suspension apparatus for supporting the flying shoe 64 which, in turn, holds the read/write head 62. The flying shoe 64 has an air bearing surface 82 which closely approaches a data storage surface of a disc pack. The shoe also has a back surface 84 which is attached to the gimbal spring 66. The gimbal spring 66 has a perimeter portion 86, a central portion 88, and a neck portion 90 which extends between the central and perimeter portions to connect them. The central portion 88 is bifurcated, having two widely separated arms 92 and 94. Each of the arms is joined to one side of the flying shoe at the surface 84 thereof. The gimbal spring is mounted, with respect to the flying disc surface, so that the portions 57 and 59 of the perimeter portion extend with an upstream component up to the neck portion, the neck portion then extending with a downstream component to the central portion.

The flying shoe 64 includes a slot which contains part of the head 62, and windings 96 are wound about portions of the head. A concave bearing jewel 98 fixed to the center of the flying shoe receives forces from the pin 99 of a load stud 100. The load stud 100 is attached to support leaf 68 at a side of an aperture 104 therein. The stud has a rounded upper surface which can be pressed hard against bearing 98 by the landing spring 70 when the shoe is over a flying surface. The force transmitted through the pin 99 of the stud pushes the flying shoe into the thin boundary layer of air moving with the rotating disc storage surface.

The gimbal spring 66 is supported on the support leaf 68 by a pair of screws (not shown) which extend through holes 101 and 103 in the perimeter portion of the gimbal spring and through corresponding holes 102 and 105 in the support leaf. A pair of washers 107 maintain a predetermined spacing between the gimbal spring and leaf. The holes 101 and 103 are on diametrically opposite sides of the gimbal spring. The jewel bearing 98 is located approximately directly between the holes 101 and 103, that is, on a line connecting them, and the bearing is located equally distant from the holes. The pivot jewel bearing is positioned in the centerline 97 of the shoe, and the magnetic head 62 is offset from the centerline by the radius of the jewel.

The landing spring 70 bears against the load stud 100 with a large force such as 140 grams. The load stud, in turn, presses down on the shoe 64 with nearly 140 grams, the support leaf 68 supplying only several grams of lifting force to oppose this. The shoe 64 is supported by the boundary layer of air on the disc flying surface, with a force that varies with clearance, being about 140 grams at a 100 microinch spacing. The gimbal spring 66 provides negligible resistance to up and down movement of the shoe 64 with respect to the support points at holes 101 and 103. Thus, the clearance between the shoe 64 and the disc flying surface is a resultant primarily of the landing force of landing spring 70 and the support provided by the air bearing shoe 64. As will be explained below, however, the gimbal spring 66 is important in controlling movements of the shoe 64 in other than the vertical direction.

The support provided by the gimbal spring 66 and bearing jewel 98 provides considerable freedom to the air bearing surface 82 to follow any small out-of-plane contours of the data storage surface. The force applied by the boundary layer air to the shoe 64 causes the shoe to align itself with the local disc surface. The resultant of all normal pressure on the air bearing is transmitted through the jewel bearing 98. The attitude of glide and the degree of stability of the air bearing are affected by the geometrical placement of the pivot jewel. As earlier mentioned, in this embodiment of the invention the pivot jewel is positioned in the centerline 97 of the surface 82, and the magnetic head is offset from the centerline by the radius of the jewel.

The gimbal spring is formed from a flat sheet of spring material so that when unstressed, all portions are in approximately the same plane. The form and orientation of the gimbal spring allows freedom of movement of the shoe 64 in certain modes but not in others, to achieve the required shoe compliance. One mode of movement that must be restrained is radial translation. That is, the radial position of the flying shoe on the disc must be closely controlled to allow for the location of a large number of closely spaced concentric tracks on a flying surface. The planar or sheet form of the gimbal spring provides great stiffness in resisting radial translation.

One mode of movement that must be allowed is rotation about a transverse axis, such as line 110 or an axis parallel to it. When the shoe first approaches the flying surface, it should be in a slightly "nose up" attitude, to assist in the formation of a "squeezed" wedge of air. The shoe then rotates about a transverse axis to a proper final position, which can change to follow irregularities in the flying surface. Such rotation is accomplished by up or down movement of the upstream end 111 of the gimbal spring. This rotation is readily accomplished because the gimbal spring has a reverse or folded configuration resulting from the fact that the perimeter portion of the spring extends upstream from the holes 101 and 103 to the neck 90, and the neck 90 extends downstream to the shoe. If the shoe support extended only in one direction, such as downstream, from a point of joining to the leaf 68, then such rotation of the shoe could not be easily performed.

The use of the support leaf 68 to hold the gimbal 66 and head 62 thereon facilitates the maintenance of head alignment and position. The long length L of the leaf, which exceeds the width W of the storage track surface on each disc, results in no appreciable radial movements of the head as the outer end of the leaf moves up or down slightly to position the head adjacent to the disc flying surface. The planar form of the leaf readily resists sideward deflection to prevent the head from being positioned off the center of the track. The use of a single simple leaf to support the relatively small gimbal provides high reliability and low cost. The mounting of the load stud 100 on the support leaf 68 results in constant engagement of the needle 99 thereof in the jewel bearing 98, which prevents "-missing" as the landing spring 70 is released to press the load stud hard against the jewel.

Figure 6:
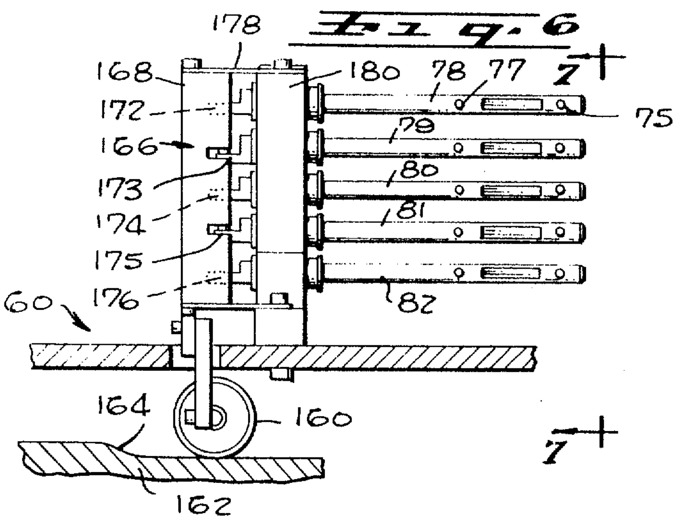
FIG. 6 is a view taken on the line 6—6 of FIG. 2.
Figure 7:
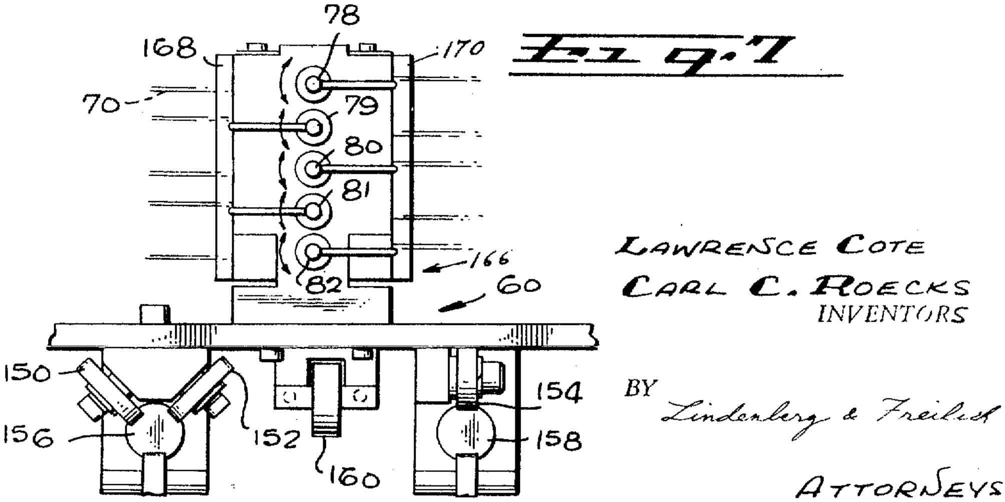
FIG. 7 is a partial end view taken on the line 7—7 of FIG. 6.

As shown in FIG. 7, the carrier 60 is supported in movement toward and away from the disc pack by rollers 150, 152 and 154 which roll on guide rails 156 and 158. During the initial insertion of the head assemblies at startup, and during their withdrawal when the disc file is to be stopped, the rod holder 78 must be rotated to lift and then release the landing springs 70. Such rotation is accomplished by a cam follower roller 160. As shown in FIG. 6, the roller 160 is moved up and down by a cam 162 fixed to the disc storage system housing. The cam follower roller moves over a ramp portion 164 when the read/write heads are immediately inside the perimeter of the discs.

The roller 160 is coupled to a plunger frame 166 with two sides 168 and 170. When the roller is allowed to move down to the position shown in FIG. 6, the plunger frame 166 moves down, allowing the five levers 172 through 176 to drop and the ends of five rod holders 78 through 82 which are attached to these levers, to drop. With respect to FIG. 7, this causes two rod holders 79 and 81 to rotate counterclockwise while the others 78, 80 and 82 rotate clockwise. Accordingly, all landing springs, such as spring 70 are released to press the heads against the disc surface. In a reverse manner, when the machine is to be stopped the carrier is moved back, the roller 160 is raised in moving over the ramp, and the landing springs are retracted.

Although particular embodiments of the invention have been described and illustrated herein, it is recognized that modifications and variations may readily occur to those skilled in the art, and consequently, it is intended that the claims be interpreted to cover such modifications and equivalents.

What we claim is:

1. Apparatus for coupling a shoe that floats a magnetic head on a flying surface, to a head carrier comprising:

a support leaf having a first end coupled to said carrier and a second end; and a gimbal of spring material having a first pair of laterally spaced gimbal portions, each joined at predetermined joining locations to said second end of said leaf, a central gimbal portion joined to said shoe and disposed substantially between said joining locations, and a connecting gimbal portion having regions extending with an upstream component, with respect to said flying surface, from each of said first gimbal portions, and having a region extending thence with a downstream component to said second gimbal portion, the downstream end of said central gimbal portion being free of attachment to said first gimbal portions.

2. The apparatus described in claim 1 wherein:

said gimbal comprises a substantially ring shaped perimeter portion, a central portion within said perimeter portion, and a neck extending downstream from the extreme upstream part of said perimeter portion to said central portion, said neck being the only portion of said gimbal which joins said central and perimeter portions.

3. The apparatus described in claim 1 wherein:

said support leaf is constructed of spring material and is positioned to bias said shoe away from said gimbal surface; and including load stud means coupled to said shoe to apply forces that push said shoe against said flying surface;

a resilient elongated landing leaf movable against said load stud means to apply a bias in a direction that pushes said shoe against said flying surface, and in an amount which substantially exceeds the bias of said support leaf; and retractor means for retracting said landing leaf from said load stud means.

4. In a disc storage system including a head for magnetic recording and readout, the improvement comprising:

head carrier means;

gimbal means having a substantially ring-shaped outer portion for coupling to said carrier means, a center portion disposed within said ring-shaped outer portion, and a neck portion extending from said ring-shaped outer portion to said center portion, said gimbal means defining an uninterrupted gap between said center and outer portions except at said neck portion; and flying shoe means attached to said center portion for holding a head.

5. Apparatus for supporting a magnetic head on a rotating disc comprising:

a carrier;

a resilient support leaf having a first end mounted on said carrier and a second end;

gimbal means mounted on said second end of said support leaf;

a shoe mounted on said gimbal means;

a magnetic head mounted on said shoe;

load stud means for bearing against said shoe;

a landing leaf spring having one end mounted on said carrier and an opposite end biased toward said load stud means to push it against said shoe; and retractor means for alternately moving said landing leaf spring away from said load stud means and releasing it to move against said load stud means.

6. The apparatus described in claim 5, including:

a concave bearing fixed to said shoe; and wherein said load stud means comprises a member fixed to said second end of said support leaf, said member having a pointed end constantly engaged with said concave bearing.

7. Apparatus for supporting a magnetic head on a data storage disc comprising:

a carrier;

an elongated resilient support member having an inner end mounted on said carrier and an outer end;

gimbal means mounted on said outer end;

a shoe for supporting said magnetic head, said shoe mounted on said gimbal means;

a head mounted on said shoe;

a concave bearing coupled to said shoe;

a load stud mounted on said outer end of said elongated support member, and having a pinlike end engaged with said concave bearing to apply forces thereto which press it toward said data storage disc; and landing spring means movable against and away from said load stud.

8. The apparatus described in claim 7 wherein:

said landing spring means includes an elongated strip of spring material.